INVENTOR.
WILFORD N. HANSEN

ATTORNEY

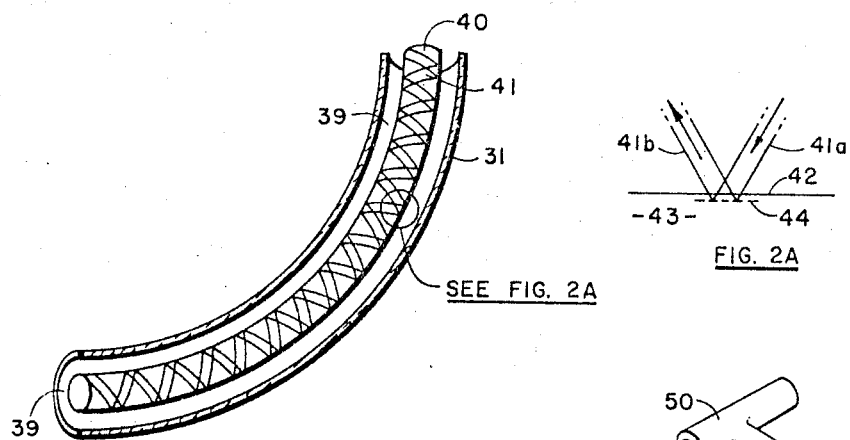
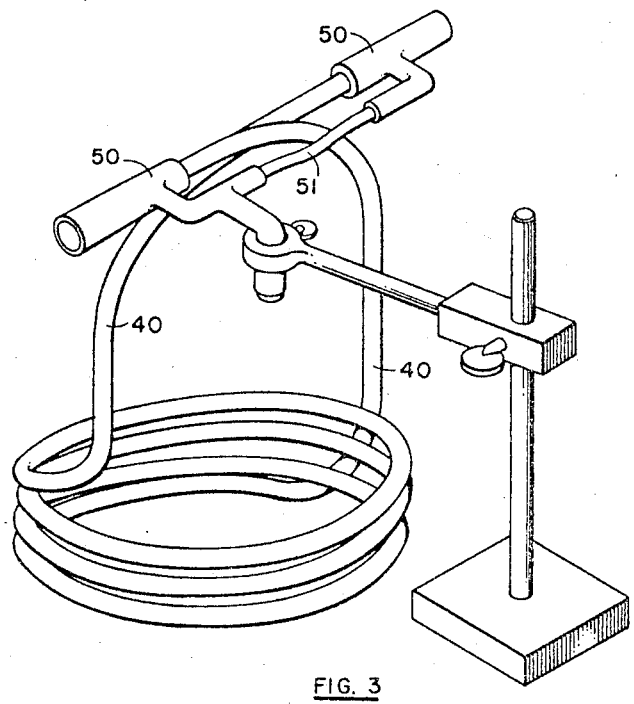
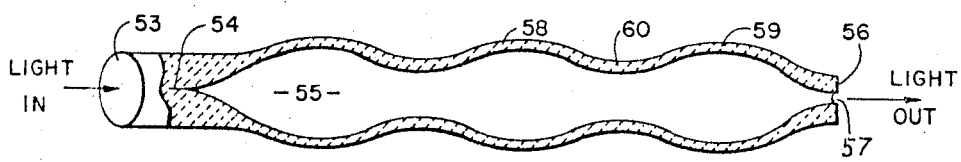

INVENTOR.
WILFORD N. HANSEN

United States Patent Office 3,433,570
Patented Mar. 18, 1969

3,433,570
MULTIPLE ATTENUATED TOTAL REFLECTION
APPARATUS AND METHOD
Wilford N. Hansen, Thousand Oaks, Calif., assignor to
North American Rockwell Corporation, a corporation
of Delaware
Filed July 15, 1963, Ser. No. 295,153
U.S. Cl. 356—128                                   5 Claims
Int. Cl. G01n *21/46;* G01j *3/00*

ABSTRACT OF THE DISCLOSURE

This disclosure relates to spectrophotometric techniques and a light-pipe cell for use in studying homogeneous phases or surfaces and related phenomena. The cell comprises a light-pipe surrounded by an absorbing phase of smaller refractive index than the pipe and in optical contact. Light is passed down the light-pipe suffering numerous near-total reflections at the phase boundary. At each reflection the electromagnetic energy penetrates the absorbing phase to a small extent and interacts therewith to provide a resulting spectrum of the phase at the boundary.

---

The present invention relates to a method and apparatus for producing representative reflection spectra of an absorbing medium and, more particularly, to a method and apparatus utilizing multiple attenuated total reflection.

The basic techniques of attenuated total reflection are well-known (see J. Fahrenfort, Spectrochemica Acta 17, 698 (1961)) and will not be described in detail here. Such prior art attenuated total reflection methods and apparatus required measurement of reflected light intensity as a function of wave length for each individual wave length, thereby materially increasing the time required for measurements. Further, the practice of such methods and the use of such devices are costly, complicated and relatively insensitive and can not be utilized in standard spectrophotometers without major modifications to the spectrophotometer.

The present invention is directed to improvements in the attenuated total reflection methods and apparatus known in the art and has as its primary object the utilization of multiple attenuated total reflections to obtain a continuous spectrum of an absorbing medium.

Therefore, the present invention has as its primary object to provide a multiple attenuated total reflection method and apparatus for carrying out the method.

Another object of the present invention is to provide a multiple attenuated total reflection method and apparatus utilizing random reflections which is simple and inexpensive and provides a continuous spectrum of a radiation absorbing medium without regard to the polarization of the incident light.

A further object of the present invention is to provide a multiple attenuated total reflection method and apparatus which may be utilized in a standard spectrophotometer without any structural modification to the spectrophotometer.

A still further object of the present invention is to provide a multiple attenuated total reflection method and apparatus which has a sensitivity and order of magnitude greater than prior art devices.

A still further object of the present invention is to provide a multiple attenuated total reflection method and apparatus which is simple in operation and construction and which provides a fast and sensitive way of obtaining a continuous spectrum of radiation absorbing medium.

These and other objects of the present invention will be more apparent from the following detailed description and claims, together with the accompanying drawings, made a part hereof, in which FIG. 1 is a perspective view of the preferred embodiment of the present invention;

FIG. 2 shows the radiation path in the device of FIG. 1;

FIG. 2A is a detailed schematic of a portion of FIG. 2;

FIG. 3 is a perspective view of a second embodiment of the present invention;

FIG. 4 is a perspective view of a third embodiment of the present invention.

Figure 1:
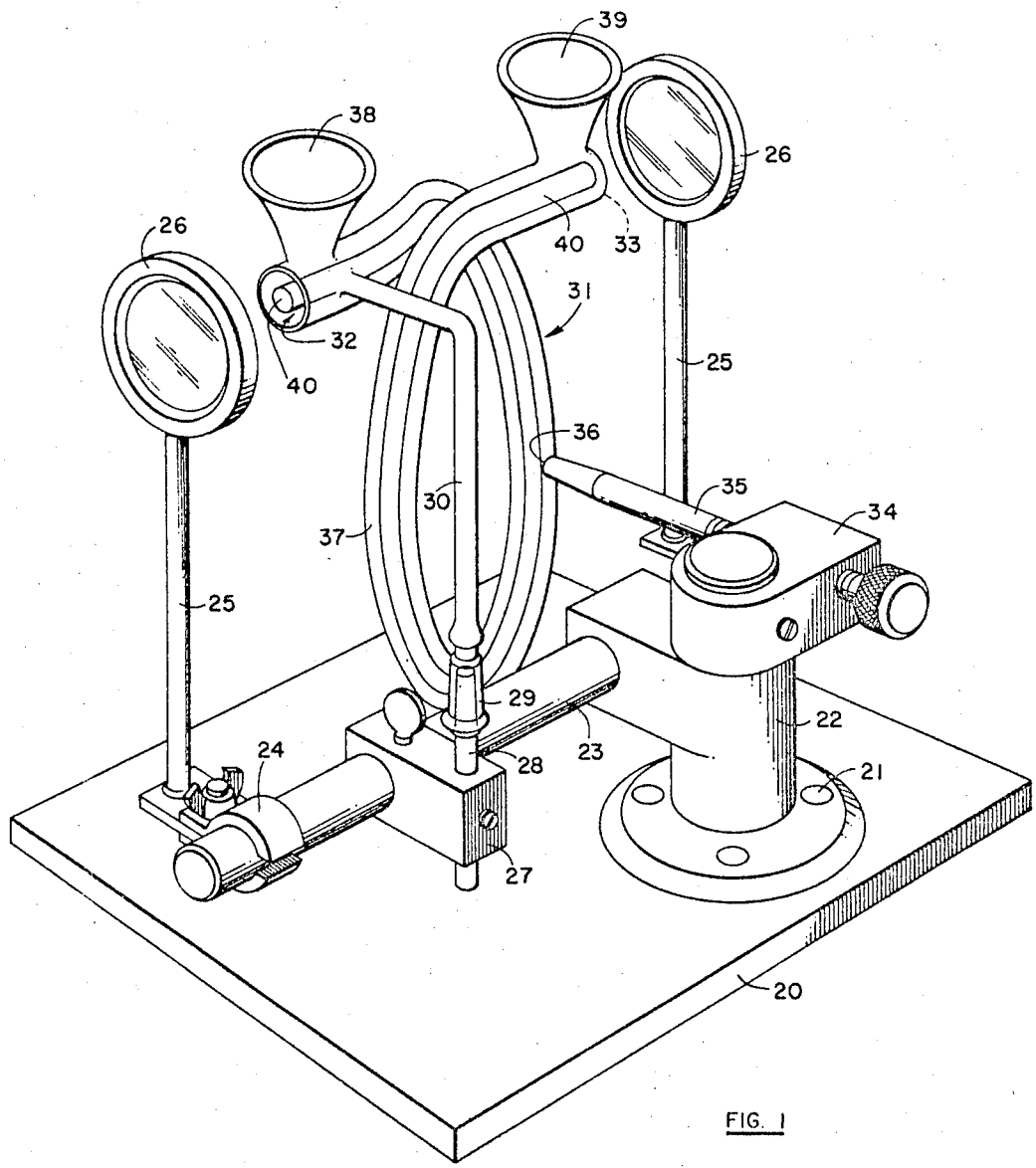

Referring now to the drawings in detail, FIG. 1 shows the preferred embodiment of the multiple attenuated total reflection apparatus of the present invention and comprises a base 20 having attached thereto by bolts 21 a support pedestal 22. The support 22 contains a rigid horizontal member 23 extending from both sides of support 22. The member 23 supports an adjustable clamp 24 (only one shown) at each of its extremities which is connected to a rod 25. At the upper end of each rod 25 is a radiation focusing member 26, which is used to direct the radiation, i.e., infrared, visible or ultraviolet, upon the multiple attenuated total reflection apparatus. A second adjustable support member 27 is attached to member 23 and has an extending tapered rod 28 on which a tapered cylindrical connector 29 is removably supported. The connector 29 is integrally connected through rod 30 to a hollow cylindrical container 31 having two radiation transmitting faces 32 and 33. The support 22 includes a rotatably adjustable alignment member 34 through which a screw adjustment rod 35 extends to make contact at 36 with container 31. In this manner the container 31 may be removed and replaced and the predetermined alignment of member 26 with faces 32 and 33 maintained in both vertical and horizontal planes.

The fire polished faces 32 and 33 of the container 31 close the ends of the cylindrical volume 37. Funnel shaped members 38 and 39 are provided for introducing liquid media into the volume 37. A centrally located radiation transmitting rod 40 has its extremities in radiation transmitting contact with, is fused to or extends through, each of the faces 32 and 33 and extends along the approximate middle of volume 37.

The embodiment of FIG. 1 is adapted for multiple attenuated total reflection spectra measurements in the visible region of the electromagnetic radiation spectrum and is, therefore, made of standard laboratory glass. However, other materials having appropriate radiation transmitting qualities for other portions of the spectrum may be utilized, e.g., quartz, AgCl, Ge, Si, Se and $As_2S_3$. Further, while the radiation transmitting member 40 has been indicated to be a rod, a fiber bundle could also be utilized. Another contemplated modification of the apparatus of FIG. 1 is to provide a cylindrical radiation transmitting member equivalent to volume 37 of FIG. 1 and substitute a volume equivalent to the rod 40 into which media to be analyzed may be inserted. In this modification the radiation passing through one of the elements 26 would be directed to an annular surface area on the face 32 which is in optical contact with the cylindrical light transmitting member. Thus, the media containing volume and radiation transmitting means are interchangeable in this geometry.

Referring again to the preferred embodiment as shown in FIG. 1, the radiation path and the multiple attenuated total reflections are illustrated in detail in FIG. 2 where a beam of electromagnetic radiation is considered and the container 31 is sectioned to simplify explanation and illustration. The beam 41 suffers numerous attenuated total reflections as it passes down the radiation conductor 40. One of these reflections is illustrated schematically in FIG. 2A. In this illustration the incident beam 41a behaves as though it is not reflected from the surface 42 of the conductor 40 but is reflected from a point or plane within the absorbing medium 43. Thus, the reflected beam 41b is displaced from the incident beam 41a. In this manner the radiation is selectively absorbed by medium 43 within penetration depth 44 which is of the order of a few wave lengths. Since at each of these reflections the absorption of characteristic wave lengths takes place only to a small extent, the beam must be reflected multiple times, e.g., more than twenty for the visible region, from this interface in order to obtain a continuous spectrum at exiting face 33 which is of sufficient intensity. In a similar manner beams of radiation are reflected multiple times from the interface of the above described modifications of the embodiment of FIG. 1. The plane of the interface is randomly oriented with respect to the polarization of any ray and, therefore, the polarization of the incident radiation does not affect the resulting spectrum. The preferred embodiment has been utilized to obtain a continuous spectrum of a solution of potassium permanganate, for example, of an intensity equivalent to a direct transmission cell thickness of 10 microns and is reproducible to within 0.3 percent of peak absorption. Such a reproducibility in the fixed-thickness cells utilized in the prior art for obtaining points of absorption spectrum would require dimensional changes of less than 0.03 micron or about one-tenth the wave length of visible light. The spectrum obtained by the use of the preferred embodiment is the same as that obtained by the thin cell method so long as the absorption or attenuation index of the media is small compared to one.

The preferred embodiment has been described as having a single loop curvilinear path in which the number of reflections is sufficient to obtain reproducible accurate absorption spectra. In this embodiment, about a 3 mm. diameter glass rod having a single curvilinear path of a diameter of about four inches was used with a volume 37 thickness of 3 mm. The device was used with a standard Cary Model 14 spectrophotometer without alteration (see Bauman, Absorption Spectroscopy, Chapter III, John Wiley & Sons, 1962).

While the embodiment of FIG. 1 is particularly adapted for use with liquid media, the embodiment of FIG. 3 is adapted for use with solid and gaseous media. The only basic difference between the embodiments of FIG. 1 and FIG. 3 is in the latter device the media container 31 as well as funnels 38 and 39 have been eliminated, and the curvilinear path has been substantially increased in length by providing multiple loops in the electromagnetic radiation conducting member 40, i.e., the radiation path. In this embodiment the ends of member 40 are supported by Teflon members 50 interconnected through rod 51 to connector 29 which is supported in the same manner as shown in FIG. 1. The rotational alignment may also be maintained as shown in FIG. 1.

The device of this embodiment is particularly adapted for use in obtaining spectra of solid media and may be immersed in a powdered media or, in the case of soft solids, the multiple loops may be smeared with the soft solid. Further, since the number of loops may be increased to obtain increased sensitivity, the lower portion of the member 40 may be exposed to a gaseous media so that the surface of the member will be covered by chemisorption.

Where the media to be studied are highly absorbing the embodiment of FIG. 4 is particularly suitable. In this embodiment the electromagnetic radiation transmission element has a rod-like radiation receiving end 53 which separates at the center 54 to form a hollow cylindrical container having radiation transmitting walls and a contained volume 55 into which the sample to be analyzed is to be placed. The light delivering end 56 may be apertured as at 57 to provide a means for introducing a sample into volume 55, although other suitable aperture means, i.e., an inlet and outlet for a flowing stream, may also be utilized. The embodiment of FIG. 4 may also be sealed and utilized as a calibrating standard. The random radiation entering at 53 is made to suffer multiple attenuated total reflections by varying the diameter of the volume 55, i.e., providing a curvilinear radiation path as explained above with respect to FIG. 1 (see FIG. 2A).

The walls 58 along the curvilinear path may be of any desired thickness and need not be uniform either in diameter or thickness along the reflecting path length. The difference in diameter between the large diameter portions 59 and small diameter portion 60 should be sufficient so that little, and preferably none, of the incident radiation at 53 can pass to surface 56 without suffering multiple reflections so that utmost sensitivity is available. The embodiments of FIGS. 1 and 3 also provide for the reflection of all incident radiation since each of those embodiments require at least a sufficient path length to eliminate the passage of unreflected radiation.

Each of the devices of FIGS. 1–4 may be utilized in a continuous or intermittent process for measuring the refractive index of a liquid to control a process as is disclosed in U.S. Patent No. 2,569,127. However, the method of the present invention is directed to the utilization of multiple attenuated total reflection to obtain a continuous absorption spectrum of a media, or the determination of the optical constants medium. In the process of the present invention electromagnetic radiation of random angle, i.e., monochromatic radiation of random direction, is focused upon the incident face of the electromagnetic radiation conducting member of one of the above described devices. One surface of the conducting member is in optical contact over at least a portion of that one surface with the absorbing media to be analyzed. The conducting member provides a path in which the incident radiation suffers multiple reflections, each of these reflections being from an interface as shown in FIG. 2A so that a small portion of the radiation is characteristically absorbed by the media at each reflection. The number of times the radiation is reflected from the media interface is very large, i.e., preferably several hundred, but at least about twenty times. Since the incident radiation is random, the attenuated total reflections will also be random. The multiple reflected radiation passing along the conducting member will not be lost provided the angle of reflection is not less than the critical angle. Thus, the radius of curvature of the curvilinear path must be large enough so that for the particular wave length radiation utilized the angle of reflection of a substantial portion of the radiation is not less than the critical angle. However, the radius of curvature of the curvilinear path should be large enough so that little or no radiation can pass between the entering and leaving faces of the devices without suffering multiple reflections, otherwise the background radiation, i.e., unreflected radiation, which is passed to a detector will be so large a quantity as to substantially reduce sensitivity.

If the absorption index is small compared to unity the Bouguer-Beer law is essentially obeyed, i.e., at a given wave length the measured absorbance is proportional to the concentration of the absorbing species. For values of the index of absorption so large that this approximation fails, the absorbance varies quadratically with the concentration of the absorbing species. However, even if the Bouguer-Beer law is not obeyed useful continuous spectra can be obtained by the method and apparatus of the present invention.

Figure 5:
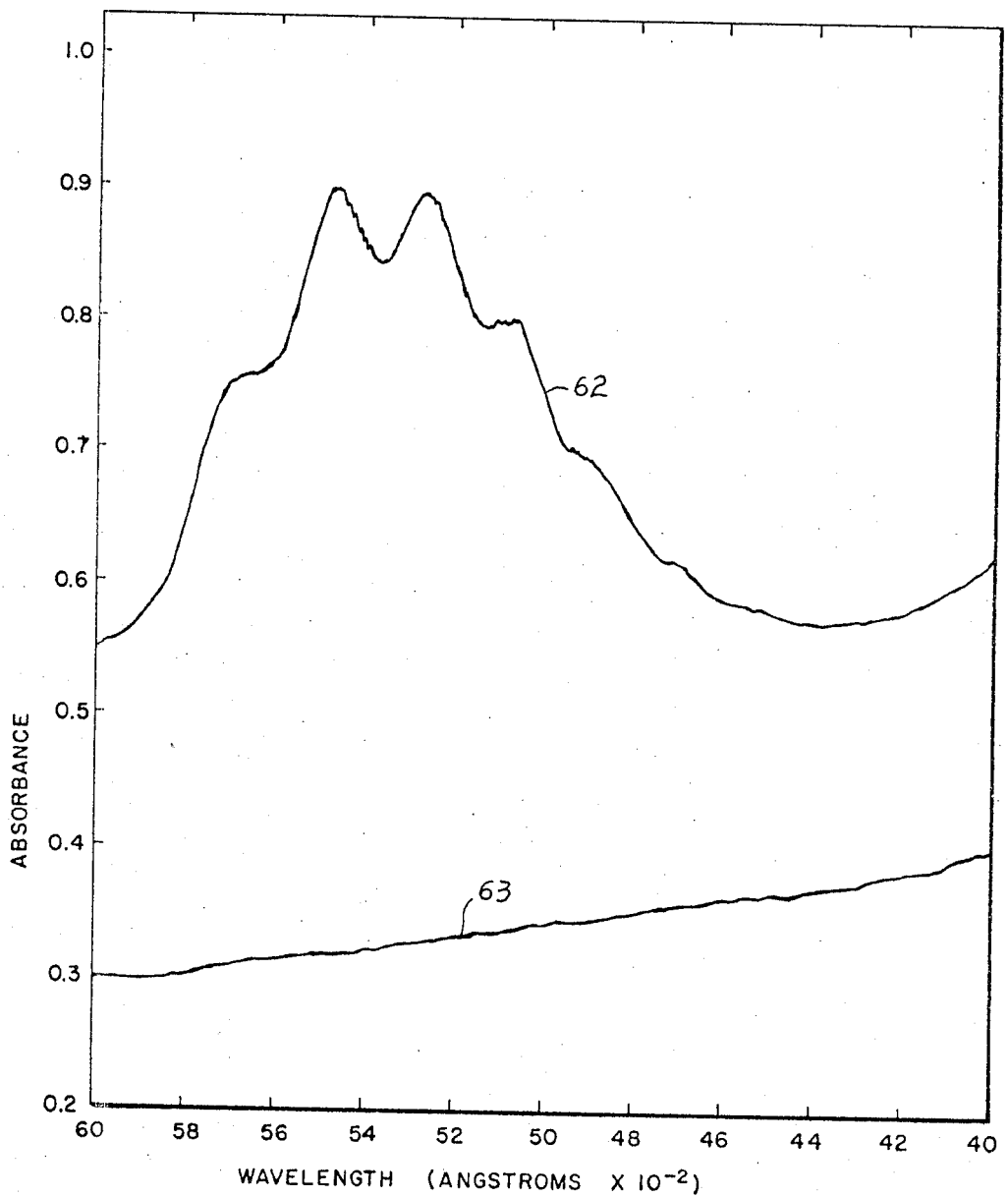
FIG. 5 is a representative spectrum obtained utilizing the device of FIG. 1.

The spectrum of $KMnO_4$ dissolved in water (0.0830 molar) was obtained utilizing the embodiment of FIG. 1 and is shown graphically in FIG. 5. The spectrum of a water solution of Eosin-B was taken for various known concentrations. At a given wave length the absorbance varied with concentration in proportional manner described above. FIG. 5 shows the absorbance as a function of wave length for $KMnO_4$ at curve 62 and the background absorbance at curve 63. This characteristic absorbance spectrum is an order of magnitude more accurate that spectrum obtained by prior art methods and devices, and was obtained by utilizing the single helical turn radiation conducting path device of FIG. 1 in a standard Cary Model 14 spectrometer (see Bauman, supra, Fig. III–28) when the device of FIG. 1 was placed in the sample position and the transmitted beam intensity was measured with a photomultiplier detector.

From the above described method and the apparatus for carrying out the method as shown in FIGS. 1, 3 and 4, it is apparent that the present invention provides an economical way of obtaining continuous spectra of absorbing media. While preferred embodiments have been described it is clear that modifications will be apparent to those skilled in the art and that the present invention is not limited by the detailed devices and method described but only by the appended claims.

I claim:

1. A multiple attenuated total reflection device comprising means for containing a media to be spectrally analyzed, electromagnetic radiation conducting means having a surface at least a portion of which is adapted to contact said media, said portion of said conducting means having a curvilinear surface, and means for exposing one end of said conducting means to randomly directed radiation, said curvilinear surface having a curvature sufficiently large so that said radiation is reflected from said surface at an angle greater than the critical angle.

2. A multiple attenuated total reflection device comprising container means defining a volume adapted to contain a media to be analyzed, electromagnetic radiation conducting means having a surface at least a portion of which passes through said volume and is adapted to contact said media, said portion having a surface which is curvilinear in at least the direction of said radiation conduction, said curvilinear surface having a curvature sufficiently large so that said conducted radiation is reflected from said surface at an angle greater than the critical angle.

3. A multiple attenuated total reflection device comprising means including at least one curvilinear boundary for conducting electromagnetic radiation along a path, said curvilinear boundary having a curvature sufficient to prevent radiation entering one end of said conducting means from passing to the other end of said conducting means without multiple random reflections from said boundary, means for contacting at least a portion of said boundary with a radiation absorbing media so that said radiation is reflected from said absorbing media at an angle greater than the critical angle, and means for recording the continuous spectra of said reflected radiation.

4. The device of claim 3 wherein said first-named means includes a hollow radiation conductor and said means for contacting includes an aperture communicating with the interior of said hollow conductor for inserting said media within said conductor.

5. The device of claim 3 wherein said first-named means includes an elongated radiation conducting member, said member having at least one helical turn.

References Cited

UNITED STATES PATENTS

| 3,282,149 | 11/1966 | Shaw et al. | 88—14 |
| 3,071,038 | 1/1963 | Vollmer | 88—14 |

OTHER REFERENCES

Bell Labs Record, New Infrared Spectro-Technique, vol. 40, p. 62, February 1962.

Photoelectric Refractometer, Karrer et al., Journal of Opt. Soc. of Amer., vol. 36, No. 1, January 1964, pp. 42–46.

RONALD L. WILBERT, *Primary Examiner.*

T. MAJOR, *Assistant Examiner.*

U.S. Cl. X.R.

356—74